Feb. 13, 1934.    F. H. MAYOH    1,947,300
WELDING APPARATUS
Filed June 28, 1932    2 Sheets-Sheet 1

Witnesses:
Amos Gray
James Mayoh

Inventor:
Frank H. Mayoh.

Feb. 13, 1934. F. H. MAYOH 1,947,300
WELDING APPARATUS
Filed June 28, 1932  2 Sheets-Sheet 2
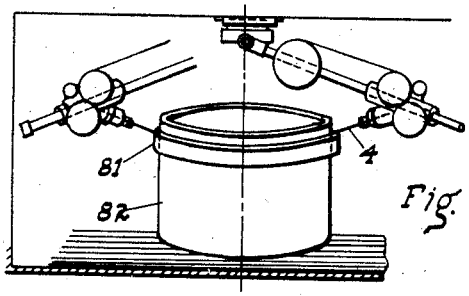
Fig. 3.
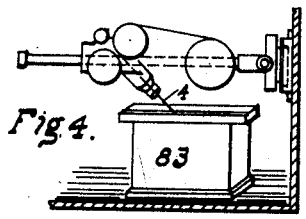
Fig. 4.
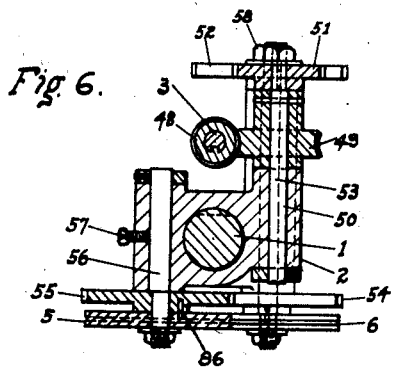
Fig. 6.
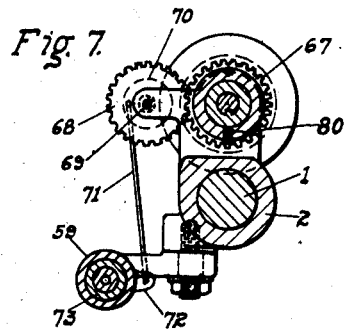
Fig. 7.
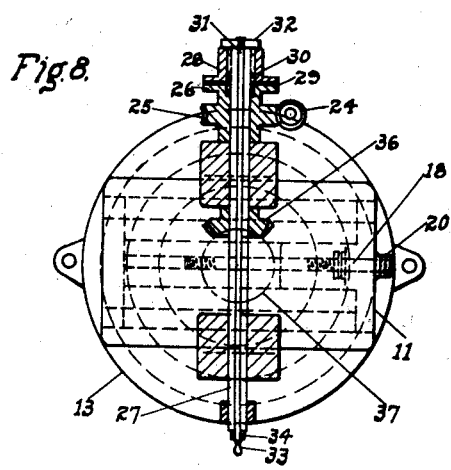
Fig. 8.
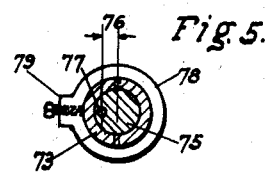
Fig. 5.
Fig. 9.
Witnesses;
Amos Gray
James Mayoh.
Inventor;
Frank H. Mayoh.

Patented Feb. 13, 1934

1,947,300

UNITED STATES PATENT OFFICE 1,947,300

WELDING APPARATUS

Frank H. Mayoh, Springfield, Mass.

Application June 28, 1932. Serial No. 619,725

19 Claims. (Cl. 219—8)

This invention relates to welding apparatus and more particularly to that type of apparatus in which an electric arc is struck between an electrode and a metallic joint thereby fusing the abutting edges of the joint together.

One of the advantages of this invention is the diverse use to which it can be put embracing, the welding of vertical joints and angular inclinations therefrom, the welding of horizontal joints or angular inclinations therefrom, the welding of circular joints and segments.

A further object of my invention is to provide an apparatus for construction work that is adapted to floor, ceiling, wall or bracket mounting.

Another object is to provide a welding head that can be readily traversed along a pillar of indefinite length.

Another object is to feed an electrode in the form of a wire and to oscillate said electrode at the junction of the weld.

A further object of my invention is to provide means to vary the feeding rate of the electrode.

Another object of the invention is to provide an adjustable base structure to place the welding head in location to weld a seam.

Other objects and advantages of my invention will appear from the following description of one embodiment of the invention.

In the drawings, which show merely a preferred form of the invention.

Fig. 3 is a general view in perspective showing the apparatus set up for revolvable welding.

Fig. 4 is a general view showing the apparatus set up for horizontal welding.

Fig. 5 is an enlarged diagonal section view on line 5—5 of Fig. 1 to show the electrode oscillating bushing.

Fig. 6 is an enlarged section view on line 6—6 of Fig. 1 showing the feeding rolls and drive therefor.

Fig. 7 is an enlarged sectional view taken substantially on the irregular line 7—7—7 in Fig. 1 to show the oscillating mechanism.

Fig. 8 is a section view on line 8—8 of Fig. 1 showing the drive shaft and base structure, this is drawn to the same scale as Fig. 1.

Fig. 9 is a section view of a part welded showing two types of welded joints.

Like numerals designate like parts throughout the several views of the drawings.

Figure 1:
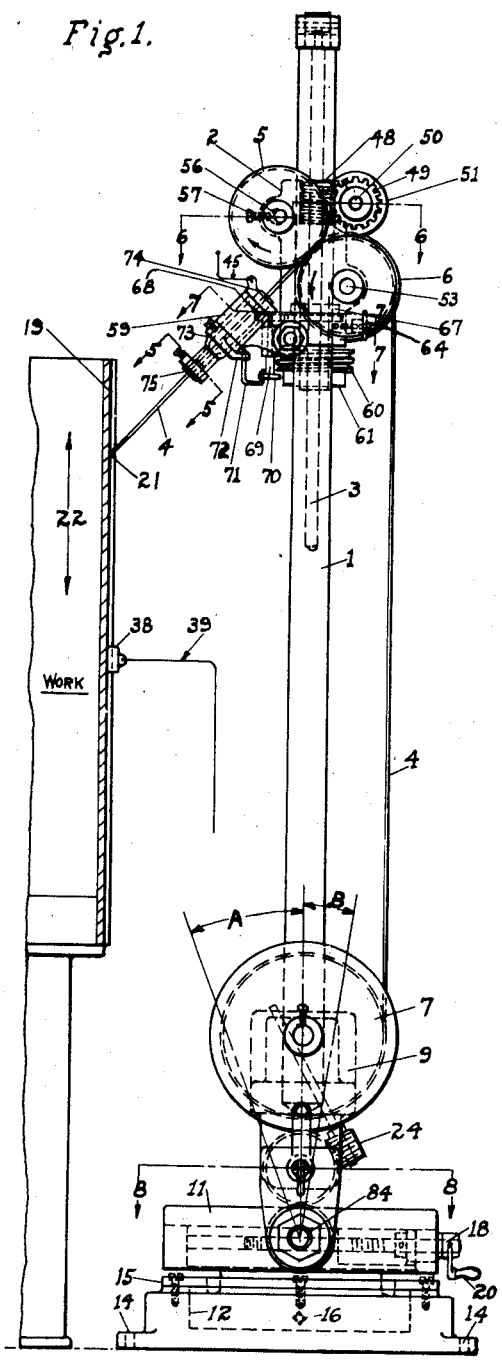
Fig. 1 is a front elevation showing the general arrangement of this welding apparatus.
Figure 2:
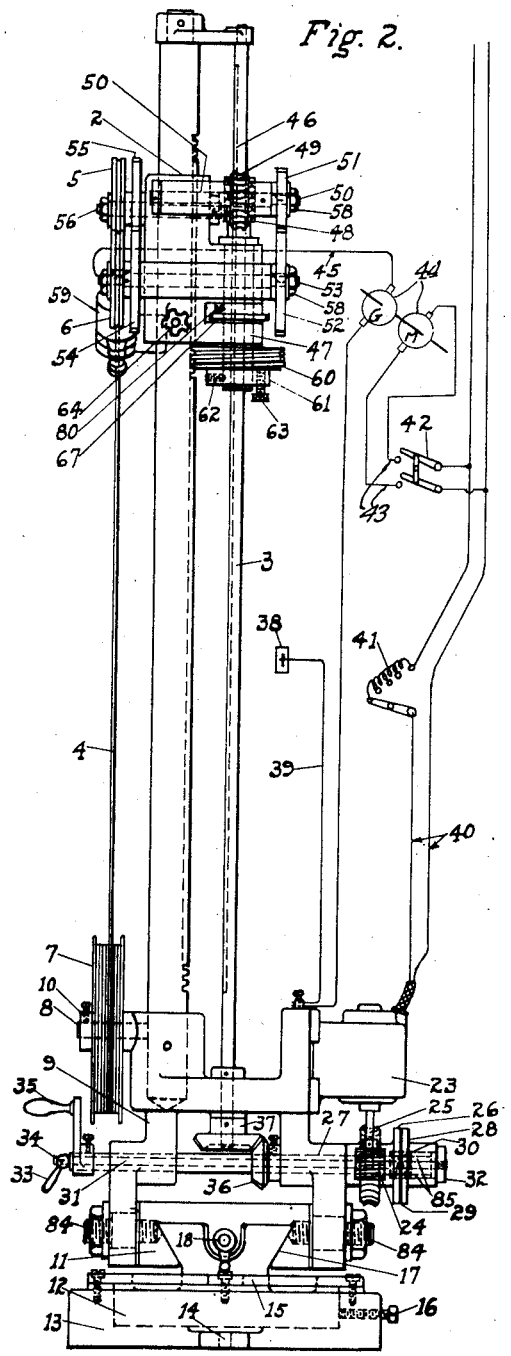
Fig. 2 is a side elevation of the same.

Referring to the drawings and more particularly to Figs. 1 and 2, part number 1 is a pillar on which is free to slide a welding head the frame of which is indicated as 2. Pillar 1 may be of any desired length and I have in mind that, it could be long enough for general outdoor structural purposes as well as short enough to facilitate the welding of machine structures inside a building. There is a revolvable shaft 3 running parallel with pillar 1 which is the operative means for causing the welding head to traverse along the pillar. This shaft 3 also operates the mechanism for feeding and oscillating a welding electrode 4. The welding electrode 4 is a continuous welding wire that passes between feeding rolls 5 and 6, by means of which it is fed from a supply reel 7. Reel 7 is mounted on a stud 8 in a bracket 9, there being a collar 10 provided to retain the reel in place on the stud. Bracket 9 is attached to a slide 11 and it is free to pivot on two studs 84, these studs having nuts and washers which clamp the bracket to the slide in an upright position as shown, or at angular positions therefrom, either to the right or left, as indicated at A and B in Fig. 1. This alignment feature permits the head 2 to be traversed along pillar 1, either vertically or at angles therefrom when the entire apparatus is set on the floor in the upright position illustrated by Fig. 1.

Slide 11 which is crossways adjustable is mounted on a swivel socket 12 in a base 13. The base has bolt holes at 14 to secure the entire apparatus in position on the floor, or on a ceiling as shown in Fig. 3, or on a wall as shown in Fig. 4, or the base could terminate in a wheeled truck for out door use. There is a split ring at 15 to retain the swivel socket in place, this split ring being held to the base by means of screws. A clamp screw 16 holds the swivel socket against revolving at any position that the revolvable portion of the socket may be set relative to the base. This swivel socket arrangement allows the pillar and welding head to be revolved about its axis to weld revolvably or along a seam at various radial planes and is an advantage in positioning the welding head. The upper end of the swivel socket 12 terminates in the form of a dovetailed bevel slide structure 17 which interlocks and co-acts with a corresponding bevel on slide 11. There is an adjusting screw 18 by means of which slide 11 carrying pivoted bracket 9 and the welding head may be adjusted crossways.

To place the welding electrode 4 at its delivered end (shown in the upper left of Fig. 1) against the work being welded (which is indicated at 19) cross adjusting screw 18 is operated by a handle 20. The general purpose of the welding structure afore described in detail is to take from a continuous supply of welding wire on reel 7, the weld fusing material which thus becomes an electrode and is fed along the path 4 by rolls until it forms an electric arc at 21 where it contacts with the work 19. The arcing point 21 is traversed along the work up or down in the direction of the double arrow 22 to weld along the seam. The entire base structure comprises in effect an upper pivotable member 9 which allows tilting the electrode to angular planes, a socket structure that allows of revolving the electrodes to radial positions and a cross slide that permits of setting the electrode traversely to position the electrode and in addition so that the spread of the electric arc 21 formed by fusing the electrode wire to the part welded may be varied relative to the work.

The driving members in the base unit consist of a motor 23 that may be any commercially available motor, preferably of the variable speed type and reversible, this being determined by the nature of the work. On the end of the motor shaft is a worm 24 engaging a worm gear 25 which is combined with a flange 26, this unit 24 and 25 is free to revolve on a hollow shaft 27 so that it will only drive shaft 27 when it is desired so to do. A pair of splined keyways at 85 secure slidably to the end of shaft 27 a flange with hub 28, to the inner face of this flange is attached a leather ring 29. There is a spring at 30 which presses against a recess in 26 and also against a recess in 28 so that the two are normally forced apart and leather 29 on flange 28 will not contact with the flange 26, thus allowing the worm gear with its flange to revolve freely on the shaft. Inside of shaft 27 is a rod 31 with collar 32 attached thereto. At the opposite end is a lever 33 pinned to the rod at 34 so that it may pivot thereon, the lever 33 being made with an eccentric hub and forking over the rod 31, so that when lever 33 is pulled up this eccentric hub causes collar 32 to pull against the hub end of flange 28 thereby causing the leather 29 to engage with flange 26, hollow shaft 27 thus being caused to revolve through the medium of the worm and gear drive. When lever 33 is in the released position and there is no engagement of the friction leather 29, hollow shaft 27 can be turned by hand through lever 35. Attached to shaft 27 is a beveled gear 36, which drives a co-acting gear 37 attached to shaft 3. Consequently when hollow shaft 27 is driven by the motor through the afore described mechanism shaft 3 is caused to revolve and thereby operate the head structure 2, or the head structure may be operated manually through the revolving shaft 3 when the hand lever 35 revolves the hollow shaft.

The electrode 4, through the arc 21 and the work together with a wire 45, form one pole of an electric circuit. The other pole is formed by attaching to the work any suitable terminal, one type of which is indicated at 38, which is connected by a wire 39 into the electric circuit which will be described in detail later.

With the electrical circuit energized the operator, in starting to weld and after setting his apparatus in proper relationship to his work places lever 33 in position to permit shaft 27 to revolve manually, the operator then turns hand lever 35 until the electrode wire 4 is fed by the rolls and comes in close proximity to the work to strike the arc at 21. He then immediately tightens lever 33 which causes shaft 27 to become power driven, thereby traversing head 2 along the pillar 1 to weld the joint at 21, thereby performing vertically or at an angle one operation of welding applicable to this device.

Referring to the electric system, the line wires carrying the electrical current are of the conventional constant voltage direct current type and are indicated at 40, these go direct to the motor 23 with a conventional resistance control switch for the motor speeds indicated at 41. At 42 is indicated a conventional switch to make or break the welding circuit, this switch being shown with the circuit open as the bars at 42 would be over the buttons in the lines 43 when the switch is closed. With switch 42 closed electric current is supplied to a combined motor driven generator set 44 having voltage controls on a panel of a type commercially obtainable in unit form, this causes the electrical energy to pass in effect as a final welding medium through lines 45 and 39 energizing the electrode 4 through its metallic contact at the oscillator connection and at the work terminal 38, thus making an arc with the work at 21 to cause a fusion of the metal at the welding joint, the foregoing description relates to a simple diagrammatic electric installation and is conventional in form, the switch 42 merely indicates that lines 43 are part of a separate electric circuit, which derives energy from power lines 40, to operate a motor, to drive an attached generator, in back of said motor, which in turn sends a welding current through separate wires to weld. Refinements in methods of installation, including multiple systems of wiring, solenoid control switch connections, etc., suitable for various conditions of operation are well known in the art and are commercially obtainable for electric arc welding.

Referring particularly to the welding head construction the frame of which is indicated at 2, a spline 46 is cut in shaft 3, this shaft passing through a long sleeve 47 the hole of which is made with a tongue or key therein which interlocks with the spline 46 of the shaft. The sleeve is made with a helical worm portion 48 as an integral part thereof and the combined sleeve and worm is driven by shaft 3. This revolves worm gear 49 which in turn causes shaft 50 to revolve as they are pinned together, shaft 50 having demountably attached thereto a gear 51, which meshes with another demountable gear 52, gear 52 being keyed to shaft 53 and pinned at the opposite end is a gear 54. This gear meshes with a gear of the same size 55, thereby causing roll 5 to revolve in unison with roll 6. On shafts 53 and 56 are mounted feed rolls 5 and 6. The revolving action of this entire unit causes the feed rolls 5 and 6 to advance the wire electrode 4 to perform the operation of welding. Shaft 56 is made with the end that carries the gear and roll slightly eccentric to that portion mounted in the head frame 2. By means of this eccentric action shaft 56 can be revolved in its bearing radially and it is locked in position by set screw 57, thus allowing roll 5 to be moved in or out slightly thereby shortening the center distances between the gears so that the roll will grip different sizes of wire electrode, the gears being made with sufficient clearance between the teeth to permit of this. A feature of this gear drive arrangement is that gears 51 and 52 may be removed from the shafts by removing the nuts 58, as they are keyed in place, these gears being replaced by other combinations of gears so that the feeding of the electrode wire may be varied to suit different conditions of welding. This feature allows of fast feeding where the wire used is of small diameter or slow feeding when larger wire is used. Roll 5 is pinned to gear 55 at 86.

Briefly stated, to feed the electrode 4, shaft 3 through the medium of the worm revolves the worm gear, a gear drive revolves feed rolls, whereby the electrode is unwound from reel 7 and passes between rolls and through an oscillating sleeve structure the support for which is indicated at 59. Sectional views of the gear drive and oscillating sleeve structure are shown in Figs. 5, 6 and 7. On the lower end of the head driving sleeve 47 is a large helical worm 60, held in place by a collar 61, this collar being attached by a screw 62 to the sleeve so that it revolves therewith. A knurled screw 63 having a reduced teat on its end enters worm 60 and causes the worm to revolve as collar 61 revolves. The helical worm 60 engages with co-acting teeth on the pillar 1, whereby the revolving of worm 60 causes the entire welding head structure to traverse up or down the pillar as desired, which causes the welding electrode at 21 to pass along the joint being welded. When welding certain types of work the welding head need not traverse along the pillar 1, at such times the operator turning back the knurled screw 63 so that the teat portion is out of the hole in the worm 60, thus allowing the sleeve structure 47 and collar 61 to revolve without turning the worm 60. Therefore the welding head does not traverse when shaft 3 revolves. As an additional securing or locking means a screw and knob 64 clamps against the pillar.

In arc welding practice it is advisable to agitate the electrode at the welding joint so that there is a more even flow of the welding material into the joint. This is accomplished in the present invention by a simple and novel arrangement whereby the electrode in passing through the sleeve structure carried in the support 59 is caused to oscillate the welding electrode radially about its axis, so that the welding material is distributed either in concave form as indicated at 65 in Fig. 9 or in convex form as indicated at 66 in Fig. 9. Reference is made to Figs. 5 and 7 which show in detail how this is accomplished. Attached to the drive sleeve 47 is a narrow faced gear 67, which in turn drives a co-engaging gear 68 attached to a shaft 69, this shaft having a head portion 70 at its lower end and attached to this in a hole drilled off center is a connecting rod 71. The other end of this connecting rod is attached to an arm 72 that forms a part of sleeve 73, this sleeve being free to revolve in its support 59. The revolving of portion 70 transmits motion to the connecting rod thereby causing sleeve 73 to rock back and forth about its axis. If the wire electrode simply passed through the center of the sleeve 73 the wire would merely revolve about its axis while the sleeve is oscillated. However, there are two bushings carried in the sleeve, the upper one being indicated at 74 and the hole in which is concentric with its periphery, the other bushing 75 at the lower end of the sleeve being its hole off center as indicated at 76 in Fig. 5. As the wire electrode 4 passes through the central hole in the top bushing and through the eccentric hole in the bottom bushing the action of the sleeve in rocking back and forth causes the end of the electrode arc at 21 to follow a curved path eccentric to its axis, the position of hole 77 radially around the circumference determining whether the arc followed at the welding point is concave or convex as shown in Fig. 9. This can be clearly seen by noting that if the offset hole in the bushing is set so that in oscillating back and forth it passes to the left or upper side of Fig. 1 the resulting arc made by welding will be concave as indicated at 65 (Fig. 9) while if the eccentric hole is set so that as the oscillating goes on the hole is below the center or to the right the resulting weld will be convex shaped as at 66. A ring 78 with a clamp screw 79 locks the eccentric bushing in the oscillating sleeve, the lower end of the sleeve being split so that it can be clamped tightly against the bushing.

In the general operation of this machine, as the welding head travels along the pillar the wire electrode is fed out at a speed that can be changed at the will of the operator, through the system of gearing and as the welding electrode is oscillated back and forth this insuring a welded joint of the preferred type. If it is desired to stop the oscillating, screw 80 is loosened in gear 67 so that the gear is not revolved by the driving sleeve 47. The traverse of the head along the pillar can be stopped as previously described by backing up screw 63, without stopping the electrode feed.

In Fig. 3 the welding electrode is shown welding a hoop 81, on a tank 82. The tank is set on the floor and the base of the welding apparatus is attached to the ceiling of a room, at which time the head is set so that it does not traverse along the pillar, while the swivel socket is free to revolve in the base. The operator takes hold of the head end of the welding apparatus and causes it to revolve about its axis in the base for the purpose of revolvable welding, although mechanism may be incorporated in the base for revolving purposes. In Fig. 4 the electrode is caused to travel horizontally along the top of a machine base 83. The welding apparatus at that time is set on a side wall of a building, with the machine base on the floor. The welding apparatus can be pivoted so that it will weld an angular surface at a variation from the horizontal. It will therefore be seen that this device is adaptable to the welding of many diverse projects.

It will be understood that the specific form and construction shown is merely illustrative of one type of mechanism embodying the advantages of this invention. It will be evident to those skilled in the art that many features thereof are capable of general application in the welding machine art and that changes may be made within the scope of the appended claims without departing from the spirit of the invention.

I claim:

1. In a welding apparatus including a traversible welding head support pillar having one end terminating in a base, a welding head embracing electrode feeding members and head traverse actuating mechanism operated by a drive sleeve comprising means to feed said electrode at a predetermined rate and manual regulatory means to change by intertransposing parts said predetermined rate of electrode feed relative to the welding head travel embracing a disconnecting unit to cause said electrode to feed without traversing said head.

2. In a welding apparatus including a traversible welding head support pillar, a welding head embracing electrode feeding members and head traverse actuating mechanism operated by a drive unit comprising means to feed said electrode at a synchronized predetermined rate relative to said travel and embracing means to operate at a predetermined rate said electrode feed without the welding head travel.

3. A welding machine including a traversible welding head support, a welding head embracing an electrode and electrical connections, electrode feeding roll and welding head traverse actuating mechanism operated by a drive sleeve and comprising a worm and changeable gear assembly to feed said electrode at a synchronized predetermined rate relative to the welding head travel including disconnecting means to cause said electrode to feed without traversing said head.

4. A welding machine including a support and a welding head adapted to travel along said support, an electrode and electrical connections, electrode feeding roll and drive comprising a unit assembly and intertransposable members to feed said electrode relative to the welding head travel along said support at a predetermined rate embracing means to change said relative predetermined rate of electrode feed and including a disconnecting couple to cause said electrode to feed without traversing said head.

5. An electric welding apparatus including a welding head and support therefor, a base embracing a pivot member adapted to incline said head, a traversely adjustable support and a swivel socket connection.

6. An electric welding apparatus including a welding head, a column and means to traverse said head along said column, a pivot adapted to incline the head and column at an angle with the base, cross-ways adjustment means, a swivel socket and base, all co-actional to place said welding head in position to operate on work placed adjacent thereto.

7. In welding apparatus comprising a welding head and a column support therefor, a swivel socket unit rotatable about its axis and terminating in a base adapted to anchor in one of several radial positions the welding unit for the purpose of plural direction welding set forth.

8. In welding apparatus comprising a welding head and a column support therefor, a pivotal joint inclinable at divergent angles embracing locking means there included and terminating in a base adapted to anchor in one of several positions the welding unit for the purpose of plural inclination welding set forth.

9. In welding apparatus comprising a welding head and a column support therefor, crossways adjustment means to place said welding head at various offset positions relative to a fixed member terminating in a base adapted to anchor the welding unit in one of several divergent directional positions relative to said base for the purpose set forth.

10. In welding apparatus comprising a welding head and a column support therefor, means to traverse said head along said column; a base supporting said column interlocked adjustably and comprising in part a permanently fixed section, a pivotal joint inclinable at divergent angles substantially crossways of the electrode feed and embracing locking means therefor, a driving unit coadjustable with said pivotal member adapted to actuate the welding head at divergent directional positions.

11. A welding machine having in combination, a welding medium feeding member, a support for said feeding member, anchorage means aligning the support relative to a base, a sleeve embracing means adapting said sleeve to travel with and propel the feeding member along said support and including a driving unit for said member adapted to actuate manually and automatically the feeding member.

12. A welding machine having in combination, a welding medium feeding head, a support for said head and anchorage means aligning the support relative to a base, a sleeve embracing means adapting said sleeve to propel said feeding head along said support to traverse a seam, a driving unit for said sleeve terminating in sleeve engagement means adapted to operate from a power source and embracing a clutch connection with manual operating means to operate said feeding head traversely by hand at will and automatically.

13. An electric welding apparatus embracing an electrode feeding head comprising feeding rolls and means to deflect the electrode from its normal path of travel at the welding arc in feeding said electrode, a support member for said head terminating in an anchorage means to align the support relative to a base; revolving sleeve means to cause the electrode feeding head to traverse along said support member embracing in coaction electrode feeding roll drive units comprising in part intertransposable members to regulate the rate of electrode feed relative to the head travel and means to oscillate rotatably about its axis said electrode.

14. In a welding apparatus electrode feeding head the combination of a welding electrode, means to advance said electrode embracing an electrode oscillating device rotatable about its axis to agitate said electrode at the welding arc terminating in an offset aperture relative to the path of electrode feed.

15. In an electric arc welding machine embracing means for producing an electric arc at the junction line of metallic edges to be welded, a welding electrode, rolls to advance said electrode, means for oscillating said electrode terminating in a sleeve structure rotatable about its axis having an offset aperture contacting with said electrode to deflect at any desired amplitude the normal path of electrode travel.

16. In an electric arc welding machine including means for producing an electric arc at the junction line of metallic edges to be welded, a welding electrode, feeding means for said electrode embracing a progressive advance mechanism and an oscillating structure rotatable about its axis terminating in electrode guide apertures adapted to deflect at any desired amplitude the normal path of electrode travel, a reciprocator operating rotatably said oscillating structure.

17. In a welding head comprising an electrode electrode feeding members, means to direct the electrode embracing an oscillating terminal rotatable about its axis and adapted to vary the path of oscillation, a mechanism comprising means to oscillate said terminal.

18. An apparatus for welding having in combination a head comprising electrode feed and oscillating mechanism rotatable about the path of said electrode feed, a traversible welding head support arm adapted to guide said head, a sleeve embracing mechanism to operate said feed or oscillating mechanism, means to drive said sleeve.

19. An apparatus for welding having in combination a head comprising electrode feed mechanism, a traversible welding head support arm adapted to guide said head, a sleeve embracing means to operate the electrode feed, a helical member intercoactional with said sleeve and arm to travel with and to traverse the welding head, means comprising a drive shaft to operate revolvably said sleeve, an electric energizing source to supply current to weld and to act as a prime motive source.

FRANK H. MAYOH.